Aug. 18, 1964 J. CHUNG 3,144,780
VARIABLE PITCH SHEAVES FOR MULTIPLE V BELT DRIVE
Filed June 20, 1961 4 Sheets-Sheet 1

INVENTOR.
Jackson Chung
BY
Jones, Darbo & Robertson
Att'ys.

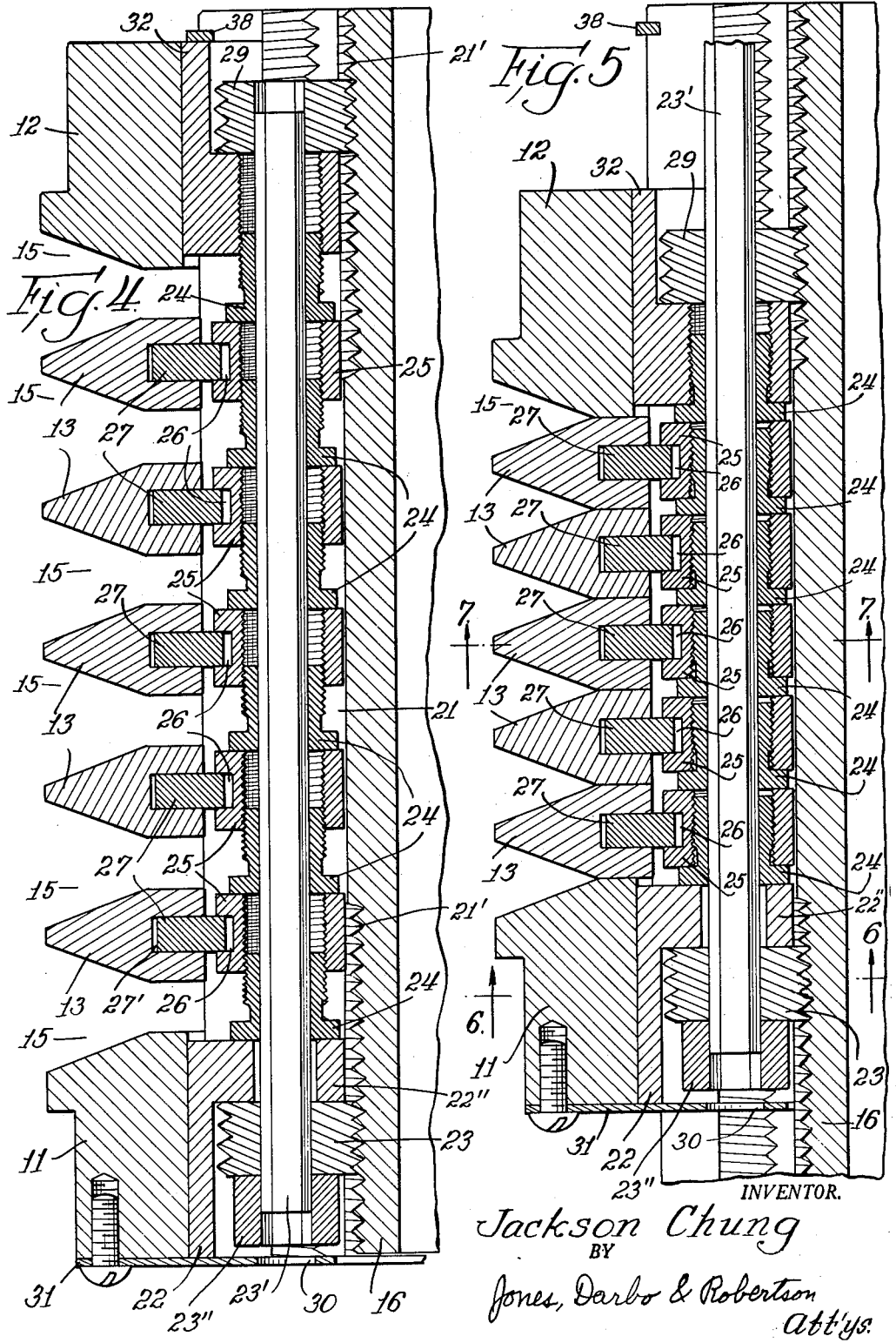

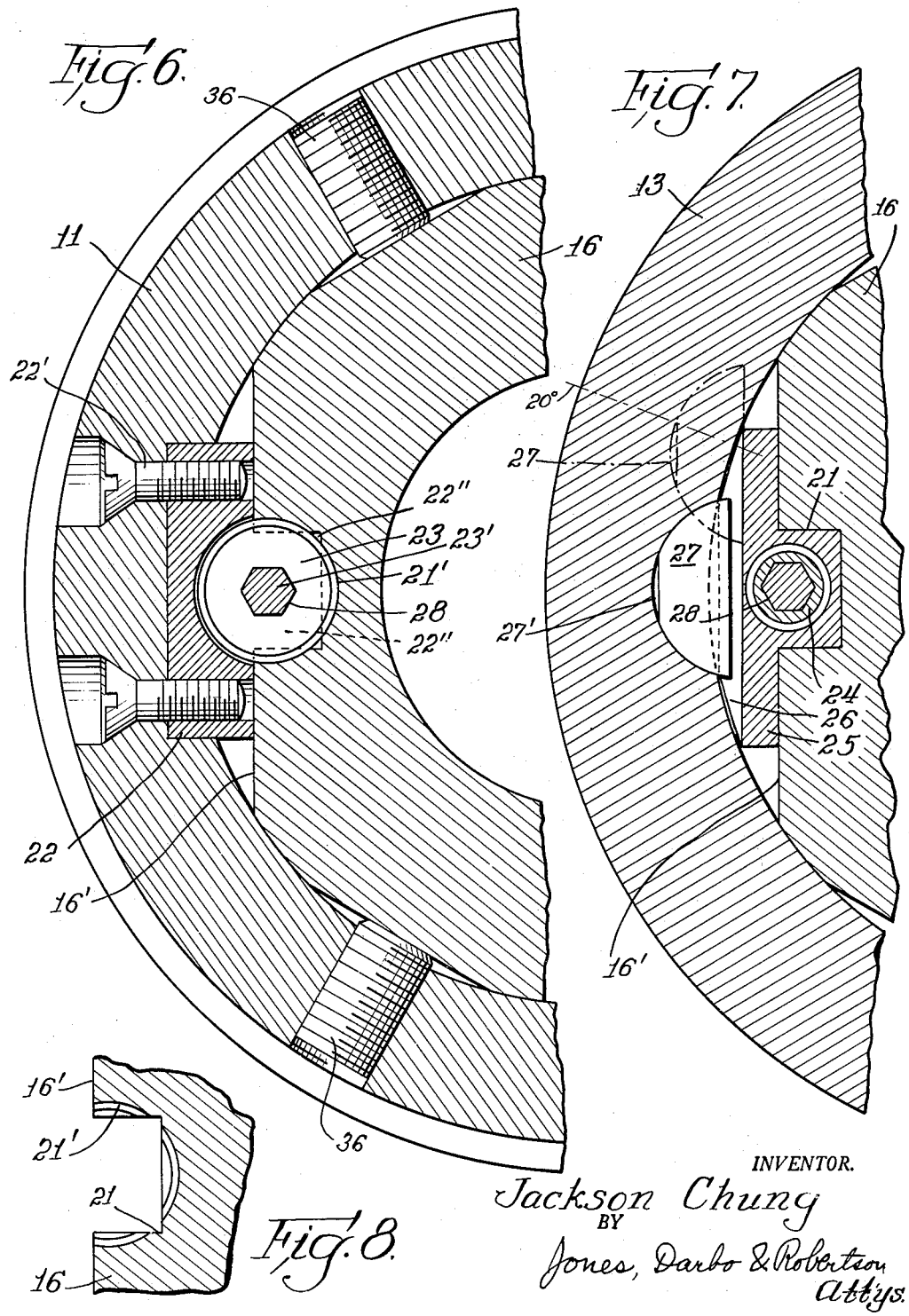

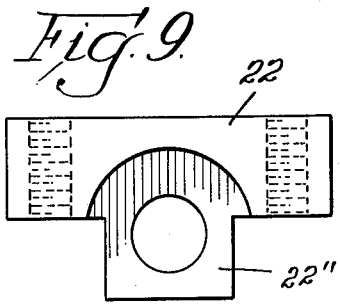
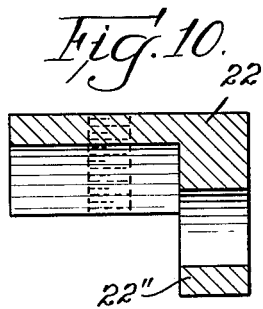
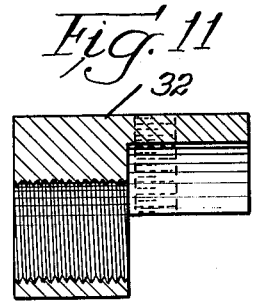
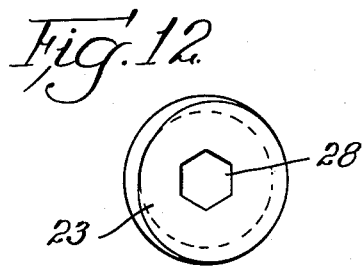
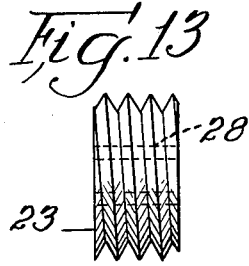
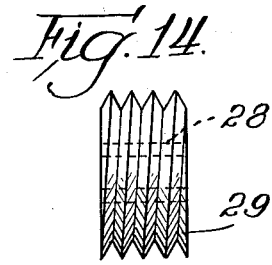
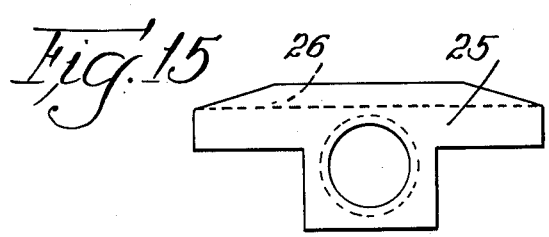
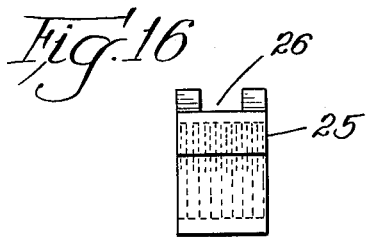
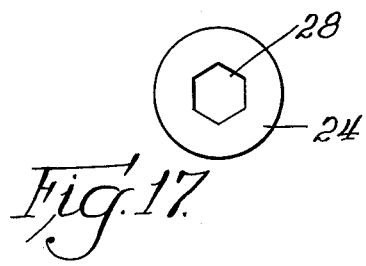
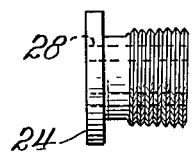

United States Patent Office 3,144,780
Patented Aug. 18, 1964

3,144,780
VARIABLE PITCH SHEAVES FOR MULTIPLE V BELT DRIVE
Jackson Chung, Mishawaka, Ind., assignor to Dodge Manufacturing Corporation, Mishawaka, Ind., a corporation of Indiana
Filed June 20, 1961, Ser. No. 118,303
16 Claims. (Cl. 74—230.17)

When the sheaves or pulleys used in V belt drives are adjusted to change the spacing between two flanges or rings between which a V belt rides, the V belt either moves closer to the axis of the sheave or is made to ride further from the axis. The result is a change in the speed ratio between the belt and the sheave. Sheaves which can be so adjusted are referred to as variable pitch sheaves, the word "pitch" referring to the distance from the axis to the effective position of the belt.

There have been fairly satisfactory variable pitch sheaves for one belt and two-belt drives. With more than two belts, the problem of maintaining all of the grooves equal to each other in width while the width of these grooves is changed is more difficult. It is then no longer possible to have all moving parts move the same amount. Also, the problem of securing the intermediate disks or flanges in the adjusted position becomes severe. If such intermediate members are subject to a minute amount of play as the sheave rotates, a phenomenon known as "fretting corrosion" develops. This type of corrosion occurs at the very surfaces where contact varies during the minute movements resulting from the play, and these surfaces are the very surfaces which must slide easily on one another for adjustment of the pitch of the sheave. Accordingly, after a lengthy period of operation in one adjustment of the pitch of the sheave, further adjustment may be difficult or impossible due to a roughening or freezing of the parts by fretting corrosion.

According to the present invention, a type of construction is provided in which a sheave may have several or even a large number of grooves for a V belt and yet remain easily adjustable. A relatively simple construction makes all of the intermediate flanges move axially by the correct proportional movements so that the spacings will all remain equal throughout the range of adjustment. Fretting corrosion is avoided by a novel application of Woodruff keys. These keys have been used before in a manner very different from that of the present invention. In the past they have been used with their length extending parallel to the axis and fit snugly in axially extending grooves or recesses in both of the members to be keyed together. According to the present invention these are turned 90° crosswise, the base of the Woodruff key resting on a chord surface of the hub carrying the adjustable flange ring. The rounded portion of the key fits in a recess in the ring so that if the ring turns on the hub, the key is shifted to a position in which it jams between the parts thereby drawing them so tight, one upon another, that there is no play as they rotate, and hence fretting corrosion does not occur.

This chord-based Woodruff key appears to be a feature of the invention having general utility, not confined to the field of variable pitch sheaves.

In spite of the fact that the Woodruff keys have a jamming action which tightens the parts against fretting corrosion, it is possible upon discontinuing the driving action simply to turn a single adjusting member and move all of the flanges with correctly proportioned but differing ratios of movement so as to adjust the pitch of all of the grooves and maintain them equal.

Other objects and advantages of the invention will become apparent from the following description and from the drawings.

Designation of Figures

FIGURE 4 is a fragmentary sectional view taken along line 4—4 of FIG. 3.

FIGURE 5 is a similar view but with the adjacent flange rings in the abutting position relative to each other.

FIGURE 6 is a fragmentary transverse sectional view taken along line 6—6 of FIG. 5.

FIGURE 7 is a fragmentary transverse sectional view taken through the center flange ring on line 7—7 of FIG. 5 showing a Woodruff key for locking the flange member to the sleeve.

FIGURE 8 is a fragmentary sectional view of the sleeve or hub, looking through the axially extending slot in the hub.

FIGURE 9 is a front elevational view of a flanged key which is secured to one end-flange ring.

FIGURE 10 is a sectional view of the same.

FIGURE 11 is a sectional view through the nut secured to the other end-flange ring.

FIGURE 12 is an end view of a pusher screw.

FIGURE 13 is an elevation of the right-hand threaded pusher screw shown in FIG. 12.

FIGURE 14 is a similar view of a left-hand threaded pusher screw.

FIGURE 15 is a face view of a flange T-nut for adjusting intermediate flange rings.

FIGURE 16 is a view of a T-nut looking lengthwise of the head of the T.

FIGURES 17 and 18 are end and side views respectively of a screw which screws into the T-nut of FIGS. 15 and 16.

General Description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The form of the invention chosen for illustration is a variable pitch sheave for a six-belt V belt drive. Thus as seen clearly in FIGS. 1 and 2 the sheave generally designated as 10 includes end-flanges 11 and 12 and intermediate flanges 13 forming between them six grooves for the six V belts 14. With the various flanges 11 and 13 pressed together as seen in FIG. 1, the belts 14 ride far out in the grooves, whereas with the sheaves spread apart as seen in FIG. 2, the belts 14 can ride deep in the grooves, the groove here being numbered 15.

Figure 1:
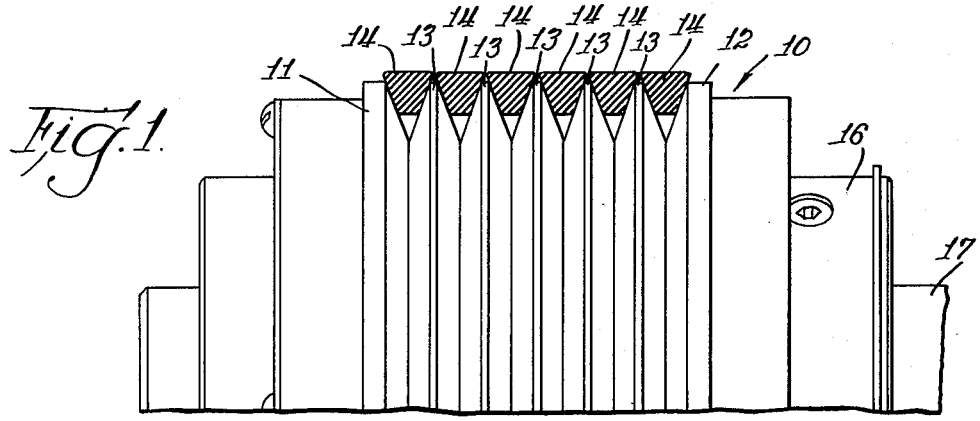
FIGURE 1 is a front elevational view of a six-groove variable pitch sheave, with the adjacent circular flange members being in an abutting position relative to each other so that the structure is at a maximum pitch diameter; only the upper half of the structure being here shown, and belts being shown in section.
Figure 2:
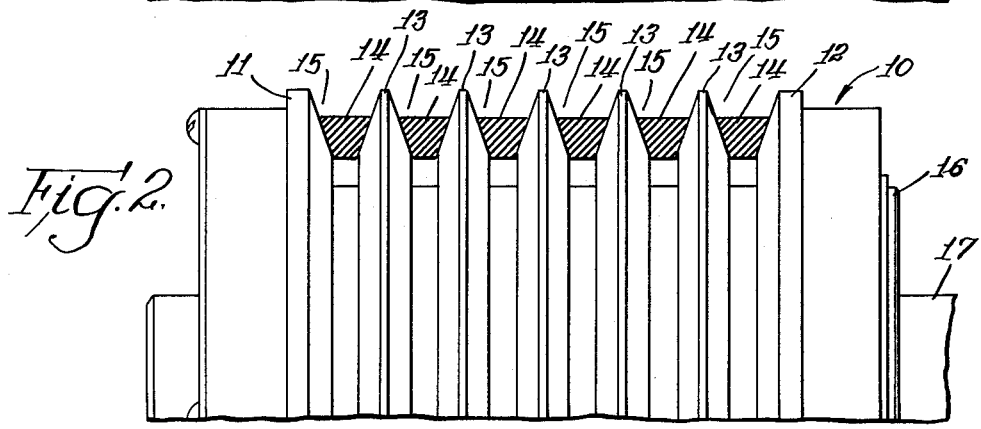
FIGURE 2 is a similar view, but with the adjacent circular flange members in a spaced apart position relative to each other so that the structure is at its minimum pitch diameter.

For convenience the parts may be designated by the terms "left" and "right" as seen in FIGURES 1 and 2. Thus flange 11 is the left end-flange and flange 12 is the right end-flange.

Figure 3:
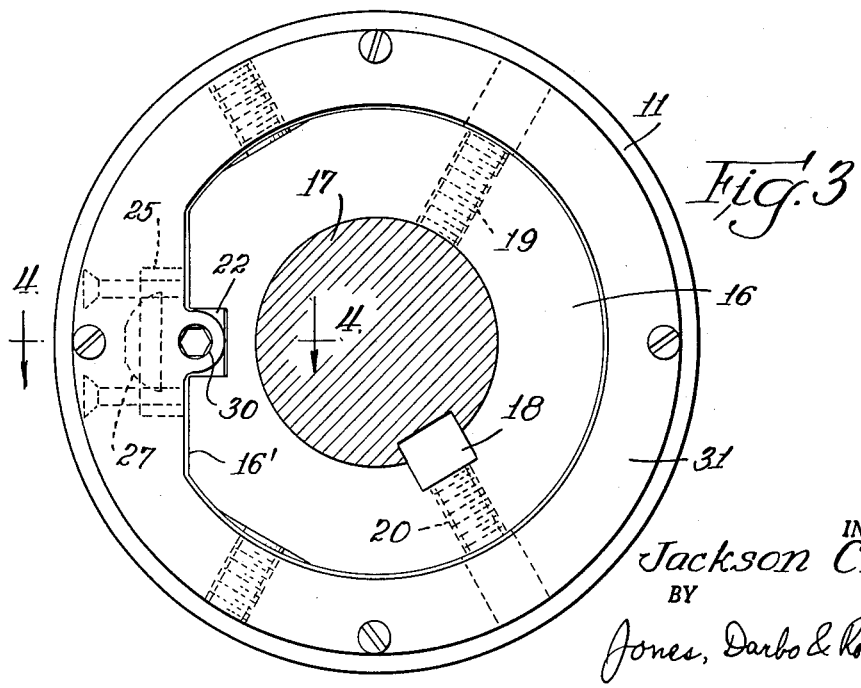
FIGURE 3 is an end elevational view of the variable pitch sheave of FIGS. 1 and 2, the supporting shaft being in section.

As seen best in FIG. 3, the flanges such as end-flange 11 surround a core or hub 16 which in turn may be a sleeve mounted on a shaft 17. The hub 16 may be keyed to the shaft 17 by a key 18 fitting snugly in axially extending grooves in both members. Setscrews 19 and 20 may secure the hub 16 dependably and firmly to shaft 17, setscrew 19 bearing directly on shaft 17 and setscrew 20 bearing on key 18.

The hub 16 has a flat side 16', which is seen also in FIGS. 6 and 7. As seen best in FIG. 8, a slot 21 of rectangular cross section extends inwardly from the front face 16' the full length of the hub 16. The end portions of the slot 21 are counterbored and threaded as indicated at 21' in FIG. 8. The relationship of the threaded end portions 21' to the unthreaded central portion 21 is also seen in FIG. 4.

Pitch Adjusting Mechanism

The pitch adjusting mechanism is located mainly in the slot 21, 21'. It is seen best in FIGS. 4 and 5, FIG. 4 showing the parts separated for minimum pitch and FIG. 5 showing the parts drawn together for maximum pitch.

The left end ring 11, which has a substantial axial dimension, carries rigidly associated with it a flanged key 22 (FIGS. 9 and 10). As seen best in FIG. 6 the flanged key 22 may be secured to the ring 11 by screws 22'. As seen in FIG. 4, a pusher screw 23 in threaded engagement with the threads of threaded slot 21' bears on the outer face of the flange 22" of flanged key 22. The pusher screw 23, as shown on FIGS. 12 and 13, together with other parts, is turned when adjustment is desired by a bar or rod 23' of hexagonal or other nonround cross section, which may be called an Allen wrench bar. It has fixed thereon a head 23" which also forms a socket for the insertion by hand of an Allen wrench. When the pusher bar 23 is turned in the pitch increasing direction, it presses the flange 22' and with it the ring 11 axially inward toward the positions shown in FIG. 5.

Bearing on the inner face of flange 22' and also turned by Allen wrench rod 23' is a threaded bushing or screw 24, which is shown in FIGS. 17 and 18. The bushing 24 is threaded into a T member or flange adjustment nut 25 which is seen best in FIGS. 15 and 16. As seen in FIG. 7 the T member 25 rests on flat face 16' of hub 16 and extends into rectangular slot 21. Thus the T 25 in many respects functions as part of the hub 16. The T 25 has on its outer face a groove 26, the bottom of which in effect forms a chord surface of the hub 16. Riding in this groove, and engageable on its chord surface is a Woodruff key 27. As seen in FIG. 7, this Woodruff key engages an arcuate recess 27' in intermediate flange ring 13. A locking function of this Woodruff key arrangement is described below, but for the present it is sufficient to observe from FIG. 4 that the Woodruff key 27 serves to position its flange ring 13 properly spaced from end-flange ring 11. Thus the threaded bushing 24 and its cooperating threaded T 25 form a jack, so that by turning bushing 24 in T 25 the flange ring 13 may be jacked away from end-flange 11.

As clearly seen in FIG. 4 there is a similar jack comprising a bushing 24 threaded into a T 25 for each of the intermediate flange rings 13, so that upon turning the Allen wrench bar 23' each is jacked away from those adjacent to it.

Referring to FIGS. 12, 13, 17 and 18, it is seen that pusher screw 23 and each of the threaded bushings 24 is provided with a hexagonal passage 28 therethrough for receiving the Allen wrench rod 23'. FIG. 14 shows a second pusher screw 29 similar to the pusher screw 23 except that it has left-handed threads while the screw 23 had right-handed threads. It also has a hexagonal passage 28 through it for receiving the Allen wrench rod 23'. Pusher screw 29 rides in the threaded slot portion 21' toward the opposite end of the hub from that in which rides the pusher screw 23. As seen at the lower end of FIGS. 4 and 5, access of a hand manipulated Allen wrench to the socket in head 23" is through an aperture 30 in a face plate 31. The face plate 31 serves to retain the wrench bar 23', rigid with head 23", in place. As seen at the upper end of FIGS. 4 and 5, pusher screw 29 bears on the outer face of a key nut 32. This key nut 32 is seen best in FIG. 11. It is rigidly secured to flange ring 12 in the same manner as is illustrated in FIG. 6 with respect to flange key 22. Thus as pusher screw 29 is turned in the pitch increasing direction, it will push the flange ring 12 inwardly toward the position shown in FIG. 5.

As seen in FIG. 4 the upper threaded bushing 24 threads into key nut 32, so that this bushing 24 and key nut 32 together form a jack operating in the same manner as the jack comprising bushing 24 and T-members 25. Indeed, the members 25 and 32 may all be called jack nuts or T-nuts.

Operation of Pitch Adjusting Means

When a hand held Allen wrench is slipped through aperture 30 and fitted into head 23", it may be used to turn the wrench rod 23" in either direction. If turned in the pitch increasing direction, it will turn all of the bushings 24 further into their cooperating nuts thereby collapsing all of the jacks. Simultaneously wrench rod 23' will turn the two pusher screws 23 and 29 to push all of the parts toward one another thereby taking up all of the slack which is produced by the collapsing of the jacks. When turned in the pitch decreasing direction, the opposite action occurs. The pusher nuts 23 and 29 are backed away or moved apart, and all of the bushings 24 are turned out of their jack nuts 25 and 32 so that with equal movements they take up all of the slack provided by the pusher screws 23 and 29, and at the same time space the intermediate flange rings 13 equally from each other and from the end-flange rings 11 and 12.

Ratio of Thread Pitches

In order for all of the slack to be taken up in both of the foregoing operations, the pitches of the threads on bushings 24 must have the proper relationship to the pitches of the threads on pushers 23 and 29. The ratio will depend on the number of slots 15 provided. The total jacking action of all of the slots (of all six jacks in the six-belt version illustrated) must equal the total movement of the two pushers. The pitch of pushers 23 and 29 must be a multiple of that of the bushings 24 equal to half the number of threads per inch (or per other commonly used unit of length). It has been found exceptionally convenient to use threads on bushings 24 having a pitch of 24 threads per inch. This permits building sheaves for different numbers of multiple belt drives by merely substituting different pushers 23 and 29 with different pitches of their threads, nearly all, especially for the more common drives, being expressed in an interval number of threads per inch. Thus, the threads per inch for the different numbers of belts, when using 24 threads per inch for bushings 24, is shown in the following table:

| No. belts: | Threads per inch |
|---|---|
| 3 | 16 |
| 4 | 12 |
| 5 | 9.6 |
| 6 | 8 |
| 7 | 6%7 |
| 8 | 6 |

Avoidance of Fretting Corrosion

To avoid fretting corrosion, it is necessary that the load bearing parts of the sheave be firmly locked together during their normal driving operation. If there is a slight amount of play, the minute movement between surfaces bearing on one another causes a type of corrosion known as fretting corrosion. It would theoretically be possible, for example, for the intermediate flange rings 13 to slide along splines or an axially extending key. However, in order for them to be capable of easy adjustment, they would have to have a fair degree of freedom in their fit with the splines or key and with the hub on which they slide. This freedom of fit for slide purposes would inevitably produce fretting corrosion, unless during operation something is done to bind the parts more rigidly. Since the fretting corrosion would occur on the surfaces which must slide, it would soon be disastrous to ease of operation of the pitch adjustment feature. In extreme cases the parts which should slide on one another might actually weld themselves together.

Rigid locking of the two end-flange rings 11 and 12 presents no great problem because they are positioned to be accessible and can be elongated axially to give plenty of room for set screws. Thus as seen in FIG. 6, setscrews 36 may be tightened after each adjustment of the pitch, and of course loosened before each adjustment of the pitch. The setscrews in FIG. 6 are shown threaded through the end ring 11 and bearing on flat surfaces of a hub 16. Similar setscrews and flat surfaces would be provided for flange ring 12.

According to the present invention an exceptionally simple and satisfactory means has been provided for "rigidifying" the fit between each intermedite flange ring 13 and hub 16. It is automatically effectuated after each pitch adjustment and automatically releases itself when the driving operation stops and a new pitch adjustment may be desired.

As seen in FIG. 7, a few degrees of rotation of flange ring 13 on hub 16 will shift the Woodruff key 27 from the position shown in full lines to that shown in dotted lines. In the dotted line position it is apparent from FIG. 7 that the Woodruff key 27 is jammed between its arcuate recess 27' and the chord surface forming the bottom of groove 26. If the key 27 had been shown resting on the center of the chord surfaces, it is apparent that the chord surface would act as a cam upon movement of key 27 to cam the key outwardly. This camming or wedging action inevitably takes place as the Woodruff key approaches the dotted line position, and the force of the wedging or camming action is proportional to the torque or turning force between ring 13 and hub 16. Accordingly, a mild turning force takes up all the play between flange ring 13 and hub 16 which permits easy movement of the flange ring 13 for adjustment, and greater torque merely increases the force with which this play is taken up. It will be apparent that although the Woodruff key 27 has been shown in a dotted line position toward the right in FIG. 7, the opposite direction of drive would cause it to shift to the left and assume a similar camming or wedging position to the left of center.

It is important to have approximately the looseness shown in FIG. 7 in the fit of the Woodruff key 27. If it fitted much more snugly than this, its camming action on the chord surface would be so gradual that once driven over to a locking position it would be wedged in so tightly that it would be strongly self-locking or self-maintaining when the torque had been removed. In other words, turning the ring back to release the Woodruff key 27 from this self-locking position would be very difficult. With the Woodruff key looser, enough to completely avoid this self-locking effect, the rigidifying action might not be strong enough and also there would be needless lost motion between the flange ring 13 and the hub 16 every time the belt drive is reversed. The fit of the Woodruff key should be such that it is substantially non-self-locking. By this is meant that it does not lock itself too firmly to be released by reasonable manual force. This condition may also be called "readily freed" or "substantially not self-maintaining when turning pressure is removed." A looseness which permits a 40° shift between extreme positions has been found satisfactory in one instance, about 30° in another. A 24° shift has been found too little.

The dimensions for achieving this condition are easily determined in a new design by simply testing a completed model and grinding a little off from the bottom of the key if locking is too great, or substituting a key 27 or a piece 25 with a little more height to reduce the clearance if the wedging action does not give enough rigidity. In achieving approximately this condition, it may be helpful to know some dimensions of a unit found satisfactory. The key 27 has a radius of curvature of ⅜" and, when centered, has a clearance of about .054" from the bottom of groove 26, which is about 1½" from the shaft axis, the hub radius being 1²¹⁄₃₂".

The principle represented by the Woodruff key could probably be provided, though less desirably, by some other jamming or gradual camming stop means. A roller, riding on a surface at an angle of 15°–20° to the tangent when locked would perhaps work as well on light loads but would present a problem of distortion or wear at heavy loads, because of its narrow contact. Fixed, non-rolling surfaces engaging at such an angle might also present wear problems and might prove more difficult to manufacture.

Although this chord based arrangement of a loose Woodruff key has been developed especially for the adjustable pitch sheaves to which this application mainly relates, it may find utility in a wide variety of devices. It would seem to be especially useful in any device where ready axial adjustability is desired between a core member such as a hub or a shaft and a surrounding member which during a driving operation must be rigidly locked to the core. It may even be found to be a convenient means of locking when such axially adjustment is not expected. In some such cases the looseness of the Woodruff key which prevents its being self-locking when the driving force is removed may not be a necessary feature.

In any instance in which the Woodruff key is snug enough not to loosen readily, a release screw may be provided for pushing the Woodruff screw in the releasing direction.

*Assembly*

Assembly is simple. At each ring is telescoped over the hub it has already fitted to it its flange adjustment nut or T 2 with a Woodruff key 27 in place and bushing or screw 24 threaded into the T. Before the wrench bar 23' is inserted, the various jacks are turned (if necessary) for equal spacing or for zero spacing, the parts are shoved together and centered, the pusher screws 23 and 29 inserted and screwed home. Then the wrench bar 23' can be threaded through all of the parts. A retaining ring 38 (FIG. 5) may be applied to limit the pitch reducing adjustment (to prevent too great a spread of the parts). Face plate 23' is applied by a screw to hold the wrench bar 23' in place, and the sheave is ready for use or sale.

*Summary of Accomplishment*

From the foregoing it is seen that a variable pitch sheave is provided for multiple V belt drives which; possibly for the first time, comprise all of the features desired in such sheaves. The pitch is adjusted by a very simple operation, and throughout the range of adjustment all of the belt grooves are maintained of equal width. In spite of the ease of adjusting movement, fretting corrosion is avoided without any extra operations being required for rigidifying the relationship between the intermediate flanges and the hub. The construction is simple, only a small number of differently shaped parts being used. For building sheaves to receive different numbers of belts, it is merely necessary to provide two different parts for each number of belts. For maximum pitch, the belts will be close together as in a conventional nonadjustable multiple belt sheave.

The sheave remains centered on the same plane through all of its adjustments to maintain the best alignment with a companion sheave. Incidentally, where an even number of belts is used, so that there is an odd number of flanges, the center flange could be permanently rigid with the hub. If for any reason it should be preferred to have an end flange remain always in the same plane, it could be permanently rigid with the hub and the pusher screw at the far end provided with twice the thread pitch previously indicated.

Unless costly manufacturing care is taken, there is likely to be some slightly objectionable inequality between the width of the grooves due to minute axial slack in the pitch adjustment features, and the desire or need to avoid binding of threads for ease of adjustment. Unless a better way is found to overcome this objection it may be preferred to make one of the pushers independent of the wrench bar, to be separately tightened after each pitch adjustment to take up all axial slack. The sheaves as a group will still be properly centered, because the one pusher screw coupled to the jacks will determine the position of the group.

I claim:

1. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, an adjusting wrench bar extending through the rings, pushers in oppositely threaded engagement with the hub turned by the wrench bar, said sheave including spacer jacks for each V groove spacing the rings forming the groove, and including two members threadedly engaging each other, one turned by the wrench bar and the other restrained from turning, the pitch of the threads of the jacks being so proportioned to the pitch of the threads of the pushers that as the wrench bar is turned the total jacking action equals the total movement of the pushers, and a Woodruff key for each movable intermediate ring, extending transversely of the axis, bearing along a chord surface of the hub and extending into an arcuate recess in its ring to limit relative turning of the ring on the hub with a camming action tightening the ring on the hub to prevent fretting corrosion but with a fit loose enough so that the camming action is substantially non-self-maintaining when turning pressure is removed, the rings then being readily freed for axial adjustment.

2. A variable pitch multiple V belt sheave according to claim 1 in which the jacks include members grooved along a cord of the hub, and the arcuate recess is an arcuate groove, with the Woodruff key extending into both grooves to hold the Woodruff key extending into both grooves to hold the intermediate flange rings aligned with the grooved jack members.

3. A variable pitch multiple V belt sheave including a hub, a series of flange rings carried by the hub, axially movable on the hub, shaped to form peripheral V grooves between them and including end rings and a plurality of intermediate rings between them, an adjusting wrench bar extending through the rings, pushers in oppositely threaded engagement with the hub turned by the wrench bar, said sheave including spacer jacks for each V groove spacing the rings forming the groove, and including two members threadedly engaging each other, one turned by the wrench bar and the other restrained from turning the pitch of the threads of the jacks being so proportioned to the pitch of the threads of the pushers that as the wrench bar is turned the total jacking action equals the total movement of the pushers, and a Woodruff key for each movable intermediate ring extending transversely of the axis bearing along a chord surface of the hub and extending into an arcuate recess in its ring to limit relative turning of the ring on the hub with a camming action tightening the ring on the hub to prevent fretting corrosion but with a fit loose enough so that the camming action is substantially non-self-maintaining when turning pressure is removed, the rings then being readily freed for axial adjustment.

4. A variable pitch multiple V belt sheave including a hub, a series of flange rings carried by the hub, axially movable on the hub, shaped to form peripheral V grooves between them and including end rings and a plurality of intermediate rings between them, an adjusting wrench bar extending through the rings, said sheave including separate screw spacer jacks for each V groove spacing the rings forming the groove, and each including two members threadedly engaging each other, one turned by the wrench bar and the other restrained from turning, and a Woodruff key for each movable intermediate ring extending transversely of the axis bearing along a chord surface carried by the hub and extending into an arcuate recess in its ring to limit relative turning of the ring on the hub with a camming action tightening the ring on the hub to prevent fretting corrosion but with a fit loose enough so that the camming action is substantially non-self-maintaining when turning pressure is removed, the rings then being readily freed for axial adjustment.

5. A variable pitch multiple V belt sheave including a hub, a series of flange rings carried by the hub, axially movable on the hub, shaped to form peripheral V grooves between them and including end rings and a plurality of intermediate rings between them with conical peripheral portions on both faces, an adjusting wrench bar extending through the rings, pushers in oppositely threaded engagement with the hub turned by the wrench bar, said sheave including spacer jacks for each V groove spacing the rings forming the groove, and including two members threadedly engaging each other, one turned by the wrench bar and the other restrained from turning, the pitch of the threads of the jacks being so proportioned to the pitch of the threads of the pushers that as the wrench bar is turned the total jacking action equals the total movement of the pushers, and said sheave including means for restraining rotation of the rings with respect to the hub and for rigidifying the rings on the hub to prevent fretting corrosion.

6. A variable pitch multiple V belt sheave including a hub, a series of flange rings carried by the hub, axially movable on the hub, shaped to form peripheral V grooves between them and including end rings and a plurality of intermediate rings between them with conical peripheral portions on both faces, an adjustaing wrench bar extending through the rings, pushers in oppositely threaded engagement with the hub turned by the wrench bar, said sheave including spacer jacks for each V groove spacing the rings forming the groove, and including two members threadedly engaging each other, one turned by the wrench bar and the other restrained from turning, the pitch of the threads of the jacks being so proportioned to the pitch of the threads of the pushers that as the wrench bar is turned the total jacking action equals the total movement of the pushers, and said sheave including means for restraining rotation of the rings with respect to the hub.

7. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, pushers in oppositely threaded engagement with the hub, said sheave including spacer jacks for each V groove spacing the rings forming the groove, and including two members threadedly engaging each other, one turnable and the other restrained from turning, means coupling the turnable jack members and the pushers to all turn in unison, the pitch of the threads of the jacks being so proportioned to the pitch of the threads of the pushers that as they are turned the total jacking action equals the total movement of the pushers, and a Woodruff key for each movable intermediate ring extending transversely of the axis bearing along a chord surface of the hub and extending into an arcuate recess in its ring to limit relative turning of the ring on the hub with a camming action tightening the ring on the hub to prevent fretting corrosion but with a fit loose enough so that the camming action is not self-maintaining when turning pressure is removed, the rings then being readily freed for axial adjustment.

8. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, pushers in oppositely threaded engagement with the hub, said sheave including spacer jacks for each V groove spacing the rings forming the groove, and including two members threadedly engaging each other, one turnable and the other restrained from turning, means coupling the turnable jack members and the pushers to all turn in unison, the pitch of the threads of the jacks being so proportioned to the pitch of the threads of the pushers that as they are turned the total jacking action equals the total movement of the pushers, said sheave including means restraining the rings from rotation relative to the hub.

9. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, pushers in oppositely threaded engagement with the hub, said sheave including spacer jacks for each V groove spacing the rings forming the groove, and including two members threadedly engaging each other, one turnable and the other restrained from turning, means coupling the turnable jack members and the pushers to all turn in unison, the pitch of the threads of the jacks being so proportioned to the pitch of the threads of the pushers that as they are turned the total jacking action equals the total movement of the pushers, said sheave including means restraining the rings from rotation relative to the hub effective by reaction to the restraining force to rigidify the intermediate rings to the hub.

10. A variable pitch multiple V belt sheave including a hub, a series of flange rings carried by the hub, axially movable on the hub, shaped to form peripheral V grooves between them and including end rings and at least one intermediate flange ring between them, means for shifting the flange rings axially along the hub while maintaining the grooves equal in width, and a Woodruff key for each movable intermediate flange ring extending transversely of the axis bearing along a chord surface carried by the hub and extending into an arcuate recess in its ring to limit relative turning of the ring on the hub with a camming action tightening the ring on the hub to prevent fretting corrosion but with a fit loose enough so that the camming action is substantially not self-maintaining when turning pressure is removed, the rings then being readily freed for axial adjustment.

11. A variable pitch multiple V belt sheave including a hub, a series of flange rings carried by the hub, axially movable on the hub, shaped to form peripheral V grooves between them and including end rings and at least one intermediate flange ring between them, means for shifting the flange rings axially along the hub, and a Woodruff key for each movable intermediate flange ring extending transversely of the axis bearing along a chord surface carried by the hub and extending into an arcuate recess in its ring to limit relative turning of the ring on the hub with a camming action tightening the ring on the hub to prevent fretting corrosion but with a fit loose enough so that the camming action is substantially not self-maintaining when turning pressure is removed, the rings then being readily freed for axial adjustment.

12. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, an adjusting wrench bar extending through the rings, pushers in threaded engagement with the hub, and one of which is turned by the wrench bar, said sheave including spacer jacks for each V groove spacing the rings forming the groove, and including two members threadedly engaging each other, one turned by the wrench bar and the other restrained from turning, the ratio of the threads of the jacks to the threads of the pusher turned by the wrench bar being such that as they are turned in unison the pusher moves axially ½ the total axial dimensional change of the jacks, and a Woodruff key for each movable intermediate ring, extending transversely of the axis, bearing along a chord surface of the hub and extending into an arcuate recess in its ring to limit relative turning of the ring on the hub with a camming action tightening the ring on the hub to prevent fretting corrosion but with a fit loose enough so that the camming action is substantially non-self-maintaining when turning pressure is removed, the rings then being readily freed for axial adjustment.

13. A variable pitch multiple V belt sheave including a hub, a series of flange rings carried by the hub, axially movable on the hub, shaped to form peripheral V grooves between them and including end rings and a plurality of intermediate rings between them, with conical peripheral portions on both faces, pushers in threaded engagement with the hub, said sheave including spacer jacks for each V groove spacing the rings forming the groove, and including two members threadedly engaging each other, one turnable and the other restrained from turning, means coupling the turnable jack members and one of the pushers to all turn in unison, the total axial dimensional change accomplished by the jacks upon a given actuation being twice the axial movement accomplished by the coupled pusher upon the same actuation, and a Woodruff key for each movable intermediate ring extending transversely of the axis bearing along a chord surface of the hub and extending into an arcuate recess in its ring to limit relative turning of the ring on the hub with a camming action tightening the ring on the hub to prevent fretting corrosion but with a fit loose enough so that the camming action is not self-maintaining when turning pressure is removed, the rings then being readily freed for axial adjustment.

14. A variable pitch sheave for a multiple V belt drive including a hub, a series of flange rings on the hub shaped to provide peripheral V grooves between them for the belts and axially shiftable for varying the width of the grooves, and means for restraining rotation of the flange rings on the hub, said sheave including means for maintaining equality of width between the grooves including separate screw jacks spacing the rings apart and coupled together to provide equal dimensional changes upon a given common actuation and means coupled to the jacks for moving at least one flange ring at one end of the series in a direction toward the remainder of the flange rings as the jacks contract.

15. A variable pitch sheave for a multiple V belt drive including a hub, a series of flange rings on the hub shaped to provide peripheral V grooves between them for the belts and axially shiftable for varying the width of the grooves, and means effected by relative angular movement of the flange for restraining rotation of the flange rings on the hub, said sheaves including means for maintaining equality of width between the grooves including jacks aligned independently of the exact angular positions of the flanges, spacing the rings apart and coupled together to provide equal dimensional changes upon a given common actuation.

16. A variable pitch sheave for a multiple V belt drive including a hub, a series of flange rings on the hub shaped to provide peripheral V grooves between them for the belts and axially shiftable for varying the width of the grooves, and means effected by relative angular movement of the flange for restraining rotation of the flange rings on the hub, said sheave including means for maintaining equality of width between the grooves including jacks aligned independently of the exact angular positions of the flanges, spacing the rings apart and coupled together to provide equal dimensional changes upon a given common actuation and means coupled to the jacks for moving at least one flange ring at one end of the series in a direction toward the remainder of the flange rings as the jacks contract with a total end flange ring movement equal to the total contraction of the jacks.

References Cited in the file of this patent

UNITED STATES PATENTS

| | | |
|---|---|---|
| 1,029,663 | Bowersock | June 18, 1912 |
| 1,325,639 | Hoagland | Dec. 23, 1919 |
| 1,799,813 | Hinderliter | Apr. 7, 1931 |
| 2,158,047 | Weston | May 9, 1939 |
| 2,226,524 | Runge | Dec. 24, 1940 |
| 2,254,045 | Nylin | Aug. 26, 1941 |
| 2,400,294 | Firth | May 14, 1946 |
| 2,657,584 | Williams | Nov. 3, 1953 |
| 2,714,520 | Krause | Aug. 2, 1955 |
| 2,876,649 | Kurre | Mar. 10, 1959 |
| 2,953,033 | Hall | Sept. 20, 1960 |

FOREIGN PATENTS

| | | |
|---|---|---|
| 884,133 | Germany | July 23, 1953 |